United States Patent [19]

Bahrman et al.

[11] 4,015,862
[45] Apr. 5, 1977

[54] SHOCK ABSORBER LOCK

[75] Inventors: Clinton F. Bahrman, Burbank;
Thomas Ross Welch, Los Angeles, both of Calif.

[73] Assignee: Clinton F. Bahrman, Burbank, Calif.

[22] Filed: Dec. 8, 1975

[21] Appl. No.: 638,323

[52] U.S. Cl. .............................. 280/754; 188/300
[51] Int. Cl.² .................................. B60R 27/00
[58] Field of Search .......... 280/754; 188/300, 322; 248/410; 29/15, 23

[56] References Cited
UNITED STATES PATENTS

| | | | |
|---|---|---|---|
| 2,515,287 | 7/1950 | Audemar | 92/25 |
| 2,917,323 | 12/1959 | Fennell | 280/754 |
| 3,254,919 | 6/1966 | Birchmeier | 188/300 |
| 3,559,776 | 2/1971 | Schultzer | 188/300 |

*Primary Examiner*—Robert R. Song
*Attorney, Agent, or Firm*—Allan M. Shapiro

[57] ABSTRACT

Automobile shock absorber is locked by this structure which includes a yoke clamped on the larger upper shell of the shock absorber and a collar pivoted thereon and embracing the lower piston shell. When solenoid tilts the collar, it locks the shock absorber piston shell against extension.

8 Claims, 3 Drawing Figures

U.S. Patent   April 5, 1977   4,015,862
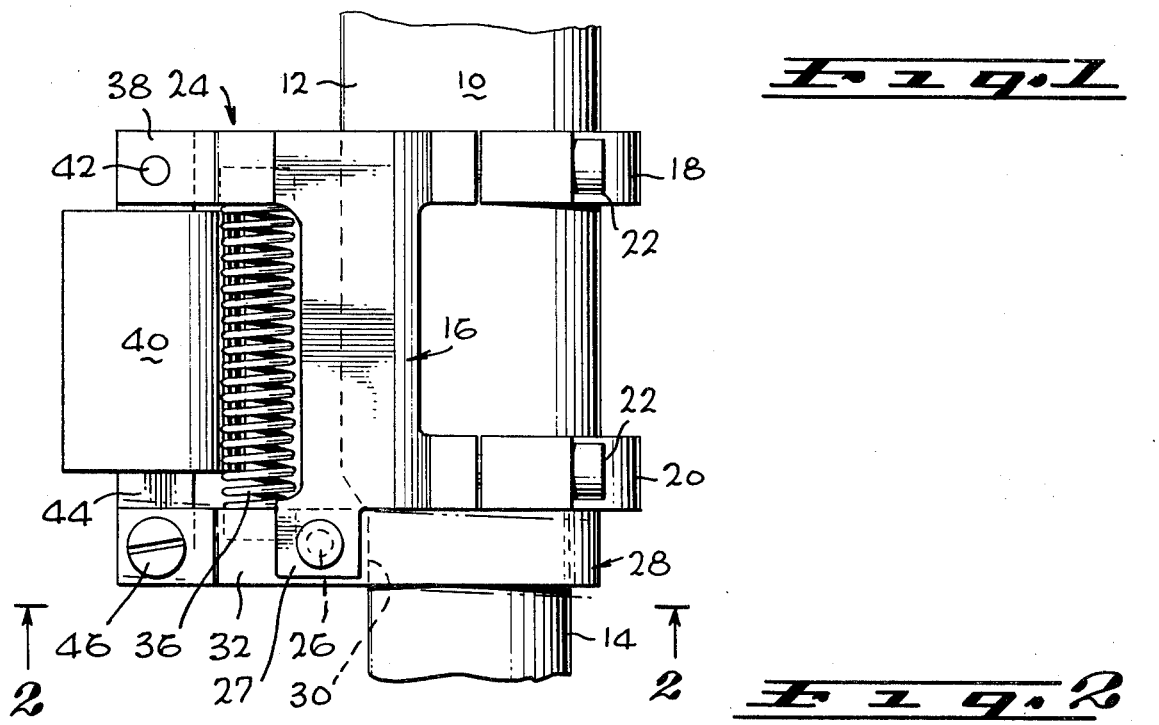
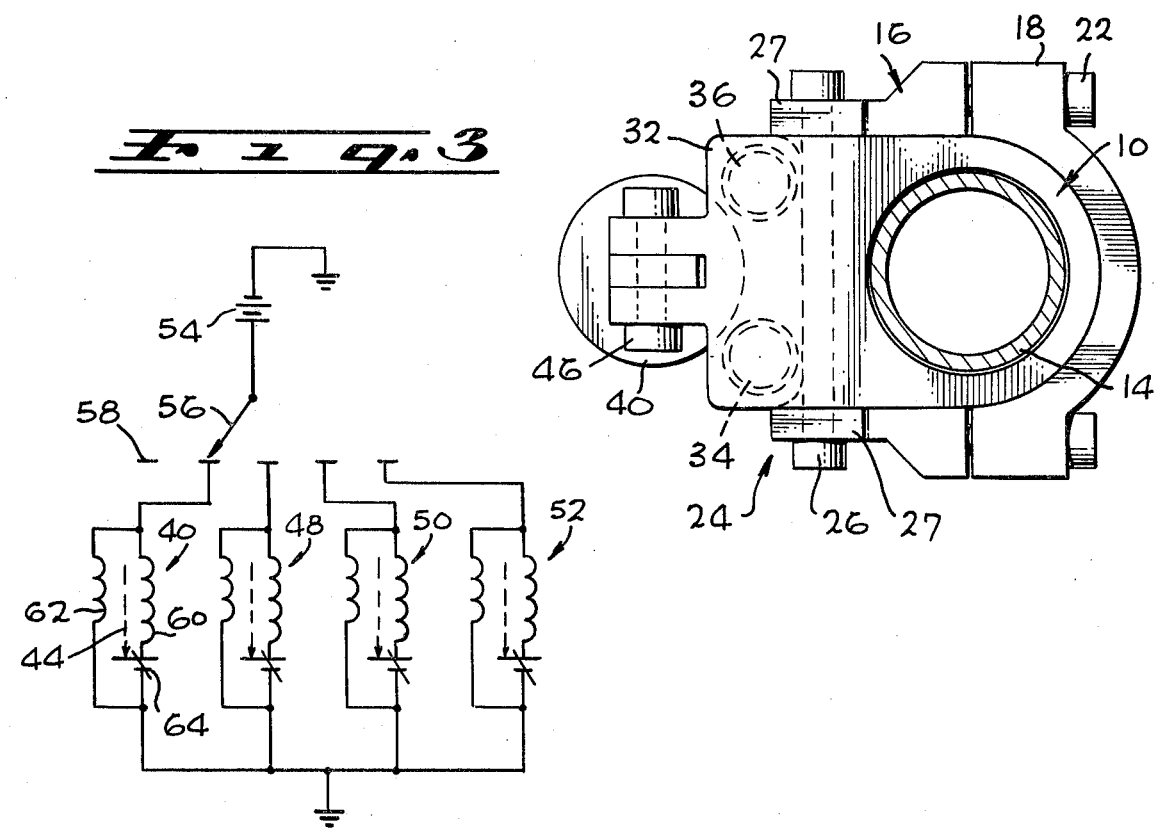

SHOCK ABSORBER LOCK

BACKGROUND OF THE INVENTION

1. Field of the Invention

This invention is directed to a lock for an automobile shock absorber to permit raising of the wheel without full shock absorber extension.

2. Description of the Prior Art

In present automotive practice, the body of the car is sprung with respect to the wheels and axles. This springing provides some isolation from road irregularities. The amount of isolation depends upon the mass of the sprung body and the spring constant and each application includes compromises because perfect isolation is not obtainable at all frequencies.

In undamped systems, the excursions of the sprung automobile body would become excessive, uncomfortable, and even dangerous to proper control of the vehicle. Thus it is conventional to apply shock-absorbing or damping devices between the sprung and the unsprung structures. The modern shock absorber is conventionally a circular cylinder with a piston therein, together with a damping fluid and damping orifice between the sides of the piston. Such a structure absorbs energy and prevents uncontrolled oscillations.

It sometimes becomes necessary with the modern automobile to change wheels, usually due to the fact that one of the tires has become flat. The jack usually supplied with modern automobiles jacks up the automobile body to the full extension of the spring between the wheel and the body until the wheel in question to be repaired is raised from the ground. Since the normal shock absorber is simply a shock-absorbing structure, it does not control the height of the wheel. Efforts have been made to provide shock absorber structures which lock, such as shown in Schultze U.S. Pat. No. 3,559,776, which provides a rigid suspension system for off-road vehicle use. This is accomplished hydraulically and is very complicated. Fennell U.S. Pat. No. 2,917,321 shows a shock absorber locking structure, but it is mechanically operated from a jacking position and is only lockable at discrete positions so that it does not reach the full capability of locking the shock absorber at the best position.

SUMMARY OF THE INVENTION

In order to aid in the understanding of this invention, it can be stated in essentially summary form that it is directed to a shock absorber lock wherein a yoke is clamped on one of the shock absorber shells and carries a pivoted collar which embraces the other shell. An actuator tilts the collar with respect to the yoke to lock the shells together.

It is thus an object of this invention to provide a shock absorber lock which is capable of locking an automobile shock absorber into any desired position. It is a further object to provide a shock absorber lock which is electrically actuated so that it can be conveniently, remotely locked. It is a further object to provide a shock absorber lock which incorporates a yoke and a collar pivoted together, with the solenoid pulling the collar to the locked position and a spring pushing it away from the locked position.

The features of the present invention which are believed to be novel are set forth with particularity in the appended claims. The present invention, both as to its organization and manner of operation together with further objects and advantages thereof, may be best understood by reference to the following description taken in conjunction with the accompanying drawings.

BRIEF DESCRIPTION OF THE DRAWINGS

FIG. 1 is a side-elevational view of the shock absorber lock of this invention shown clamped on a shock absorber lock of this invention shown clamped on a shock absorber, with parts thereof broken away.

FIG. 2 is a top-plan view of the shock absorber lock, as seen along the line 2—2 of FIG. 1.

FIG. 3 is a schematic diagram of the electric circuit which selectively controls the shock absorbers.

DESCRIPTION OF THE PREFERRED EMBODIMENT

Shock absorber 10 is of the axially operative type which has a larger outer, upper shell 12 which contains a cylinder and a lower, smaller piston shell 14. As the lower piston shell 14 is axially moved with respect to the outer, upper shell, hydraulic fluid within the shock absorber moves through orifices which absorb energy. Conventionally, the shock absorber is connected between the sprung and unsprung masses on the automobile, usually one to each wheel, so that this absorbing of energy dampens the oscillations of the sprung mass and stabilizes the unsprung mass.

Yoke 16 is clamped around the lower part of upper shell 12 and is maintained in position by caps 18 and 20 which are secured in place by capscrews 22. The yoke and caps are designed so that clamping engagement is achieved without distortion of the upper shell of shock absorber 10. In this way, shock absorber lock 24 is secured to the shock absorber, since yoke 16 serves as the main body or frame of the shock absorber lock.

Pivot pin 26 extends through the pivot legs 27 of yoke 16 near the bottom thereof. Collar 28 has an interior bore 30 which embraces lower piston shell 14. Collar 28 is pivoted on pivot pin 26 and carries lever 32 on the opposite side of the pivot from bore 30. Springs 34 and 36 engage in spring pockets in the top of lever 32 and in spring pockets in the bottom of arm 38. These are compression springs and thus urge collar 28 in the counter-clockwise direction around pivot 26 until it engages against the bottom of yoke 16 which serves as a stop for collar 28. In this position, bore 30 is in alignment with lower piston shell 14 so that the lower piston shell can freely slide through the collar without interference.

Solenoid 40 has its upper end fixed in arm 38 by means of screw 42 and has its plunger 44 pivoted on lever 32 by means of screw 46. When solenoid 40 is energized, lever 32 is raised to lower collar 28 so that its bore 30 is no longer in alignment with lower piston shell 14. This cocking engagement prevents downward motion of lower piston shell 14 with respect to upper shell 12. Any force urging lower piston shell 14 downward causes further locking of the collar 28 around the piston shell. Upon deenergization of solenoid 14 (and, in some cases, upward movement of piston shell 14), springs 34 and 36 return collar 28 to its upper, nonlocking position.

FIG. 3 illustrates the preferred circuitry for the energization of the solenoids. It is understood that a separate shock absorber lock is applied to each of the four wheels. The corresponding solenoids of the four shock absorber locks are illustrated at 40,48,50 and 52 in FIG. 3. Auto battery 54 is grounded on one side to the frame of the automobile, as is conventional. The other side of the battery is connected to four-point selector switch 56 which has its four points connected respectively to the four solenoid coils. The other sides of the four solenoid coils are connected to ground so that, when the selector switch is turned to a particular solenoid, that solenoid is energized by the automobile battery. In addition, selector switch 56 has a "reset" or "off" position 58 for when it is desired that none of the solenoids be actuated.

Each of the four solenoids is the same, and it is seen that solenoid 40 has a high force winding 60 and a low force winding 62 connected in parallel. Together, these windings have adequate force capability to pull in plunger 44 to swing collar 28 to the locked position. It is known that solenoids can be held in place with considerably less current after the plunger is pulled in and the movement is achieved. In order to conserve current, high force winding 60 has normally closed contacts 64 connected in series therewith and connected to be opened by plunger 44 when it moves to its actuated position. Thus when energized, solenoid 40 has both of its windings active to pull the plunger in and, when the plunger is almost in, switch contacts 64 open so that only low force winding 62 is energized. This is adequate to hold the plunger in and thus conserves current.

In use, when it is desired that one of the wheels of the automobile be jacked up, switch 56 is turned to energize the corresponding solenoid on that shock absorber lock. Plunger 44 pulls collar 28 into the locking position, and high force winding 60 is cut out of the circuit so that the current drain is not excessive and the solenoid does not overheat. With collar 28 locked, that portion of the automobile is jacked up by means of a jack under the frame or under the bumper. Now, the spring suspension of that wheel cannot extend because the shock absorber is locked so that, with a moderate amount of lifting, that wheel comes off of the ground for service. In this way, very little effort is required in order to raise the tire away from the road surface. When the work is done and the car is lowered, selector switch 56 can be returned to the "off" position so that springs 34 and 36 thrust collar 38 out of the locked position. An important feature of the shock absorber lock thus described is that it can be readily added to standard shock absorbers, whether already on the car or on shock absorbers on the shelf which are planned to be installed.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. A shock absorber lock comprising:
   a yoke for attachment to the first shell of a two-shell axially operable shock absorber;
   a collar pivoted on said yoke, a bore through said collar, said collar embracing the second shell of the shock absorber, said collar being pivoted on said yoke and being pivotable from a first position when said collar does not engage the second shell to a second position wherein said collar engages on and locks on the second shell to lock the shells with respect to each other; and
   motor means interconnecting said yoke and said collar to move said collar from its nonengagement position to its engagement position.

2. The shock absorber lock of claim 1 wherein said motor comprises a solenoid for urging said collar toward its locked position when said solenoid is energized.

3. The shock absorber lock of claim 2 wherein said motor means also includes a spring for urging said collar toward its nonengagement position.

4. The shock absorber lock of claim 3 wherein said collar is on one side of said collar pivot and a lever is secured to said collar and extends to the other side of said pivot, said spring being a compression spring engaged between said yoke and said lever, said collar being urged by said spring into its nonengagement position wherein said collar lies against said yoke.

5. The shock absorber lock of claim 4 wherein said solenoid is connected between said yoke and said lever.

6. The shock absorber lock of claim 2 wherein a selector switch having a plurality of contacts has one of its contacts connected to said solenoid, said switch being connectable to a battery and to other shock absorber locks so that one shock absorber lock can be selectively energized by said selector switch.

7. The shock absorber lock of claim 2 wherein said solenoid has first and second coils therein and has a normally closed contact operable by said solenoid to be opened by said solenoid coils so that when said solenoid is energized, plunger motion starts with both said coils energized and said plunger is held in its retracted position with one coil energized.

8. The shock absorber lock of claim 7 wherein a selector switch having a plurality of contacts has one of its contacts connected to said solenoid, said switch being connectable to a battery and to other shock absorber locks so that one shock absorber lock can be selectively energized by said selector switch.

* * * * *